(12) United States Patent
Yasunaga et al.

(10) Patent No.: US 12,174,487 B1
(45) Date of Patent: Dec. 24, 2024

(54) LIGHTING DEVICE

(71) Applicant: Sharp Display Technology Corporation, Kameyama (JP)

(72) Inventors: Hirotoshi Yasunaga, Kameyama (JP); Hisashi Watanabe, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/586,741

(22) Filed: Feb. 26, 2024

(30) Foreign Application Priority Data

Jun. 19, 2023 (JP) .................. 2023-100030

(51) Int. Cl.
*G02F 1/13357* (2006.01)
*G02F 1/133* (2006.01)

(52) U.S. Cl.
CPC .... *G02F 1/133605* (2013.01); *G02F 1/13306* (2013.01); *G02F 1/133603* (2013.01)

(58) Field of Classification Search
CPC ............. F21V 7/0083; G02F 1/133605; G02F 1/133602; G02F 1/133603; G02F 1/133611

USPC ........................................ 362/97.1
See application file for complete search history.

(56) References Cited

U.S. PATENT DOCUMENTS

| | | |
|---|---|---|
| 8,789,959 B2 | 7/2014 | Shimizu |
| 2013/0148036 A1 | 6/2013 | Shimizu |

FOREIGN PATENT DOCUMENTS

WO 2012/029600 A1 3/2012

*Primary Examiner* — Robert J May
(74) *Attorney, Agent, or Firm* — ScienBiziP, P.C.

(57) ABSTRACT

A lighting device includes light sources, a board having a mount surface on which the light sources are arranged, and a reflection member disposed on the mount surface of the board and having a rectangular plan view shape. The reflection member includes insertion holes in each of which at least one of the light sources is disposed and wall portions defining a surface area of the reflection member into reflection areas in a grid. Some of the wall portions surround at least one of the insertion holes. The reflection areas include a first reflection area at a corner portion of the reflection member. The wall portions include one wall portion that is included in the first reflection area and the one wall portion includes a passing portion through which light from one of the light sources that is adjacent to the reflection area via the one wall portion passes.

16 Claims, 12 Drawing Sheets

LIGHTING DEVICE

CROSS REFERENCE TO RELATED APPLICATION

This application claims priority from Japanese Patent Application No. 2023-100030 filed on Jun. 19, 2023. The entire contents of the priority application are incorporated herein by reference.

TECHNICAL FIELD

The present technology described herein relates to a lighting device.

BACKGROUND

A liquid crystal display device that includes light sources on an entire area on a back surface side of a liquid crystal panel has been known. Such a liquid crystal display device is a so-called direct type backlight unit. One example of such a liquid crystal display device includes LEDs and a reflection member. The reflection member includes insertion holes in which the LEDs are inserted, respectively, and side walls that surround the LEDs that are inserted in the insertion holes. The side walls of the reflection member are arranged to form a grid and surround the respective LEDs in a plan view. With such a reflection member, light rays emitted by the LEDS are likely to be directed toward the liquid crystal panel evenly by the side walls of the reflection member.

With such a reflection member, the light rays emitted by the LEDs are directed toward the liquid crystal panel and some of the light rays travel within a surface area of the reflection member. The number of LEDs that surround a certain area in an outer peripheral portion (a frame portion) of the backlight unit within the surface area is smaller than the number of LEDs that surround a certain area in the middle portion. Therefore, the amount of light rays that are supplied by the LEDs surrounding the certain area in the outer peripheral portion is small. With such a configuration, brightness of the outer peripheral portion of the backlight unit within the surface area is likely to decrease. Particularly, with the liquid crystal panel having a rectangular plan view shape, corner portions are most likely to be dark.

SUMMARY

The technology described herein was made in view of the above circumstances. An object is to suppress uneven brightness.

A lighting device according to the present technology includes light sources, a board having a mount surface on which the light sources are arranged, and a reflection member disposed on the mount surface of the board and having a rectangular plan view shape. The reflection member includes insertion holes in each of which at least one of the light sources is disposed and wall portions defining a surface area of the reflection member into reflection areas in a grid. Some of the wall portions surround at least one of the insertion holes. The reflection areas include a first reflection area at a corner portion of the reflection member. The wall portions include one wall portion that is included in the first reflection area and the one wall portion includes a passing portion through which light from one of the light sources that is adjacent to the reflection area via the one wall portion passes.

According to the technology described herein, uneven brightness is less likely to be caused.

DETAILED DESCRIPTION

First Embodiment

A first embodiment will be described with reference to FIGS. 1 to 8. A liquid crystal panel 10 (a display device) according to the first embodiment includes a backlight unit 30 (a lighting device). X-axes, Y-axes, and Z-axes may be present in the drawings. The axes in each drawing correspond to the respective axes in other drawings. A liquid crystal panel 20 side and a backlight unit 30 side with respect to the Z-axis direction correspond to a front side and a back side, respectively.

Figure 1:
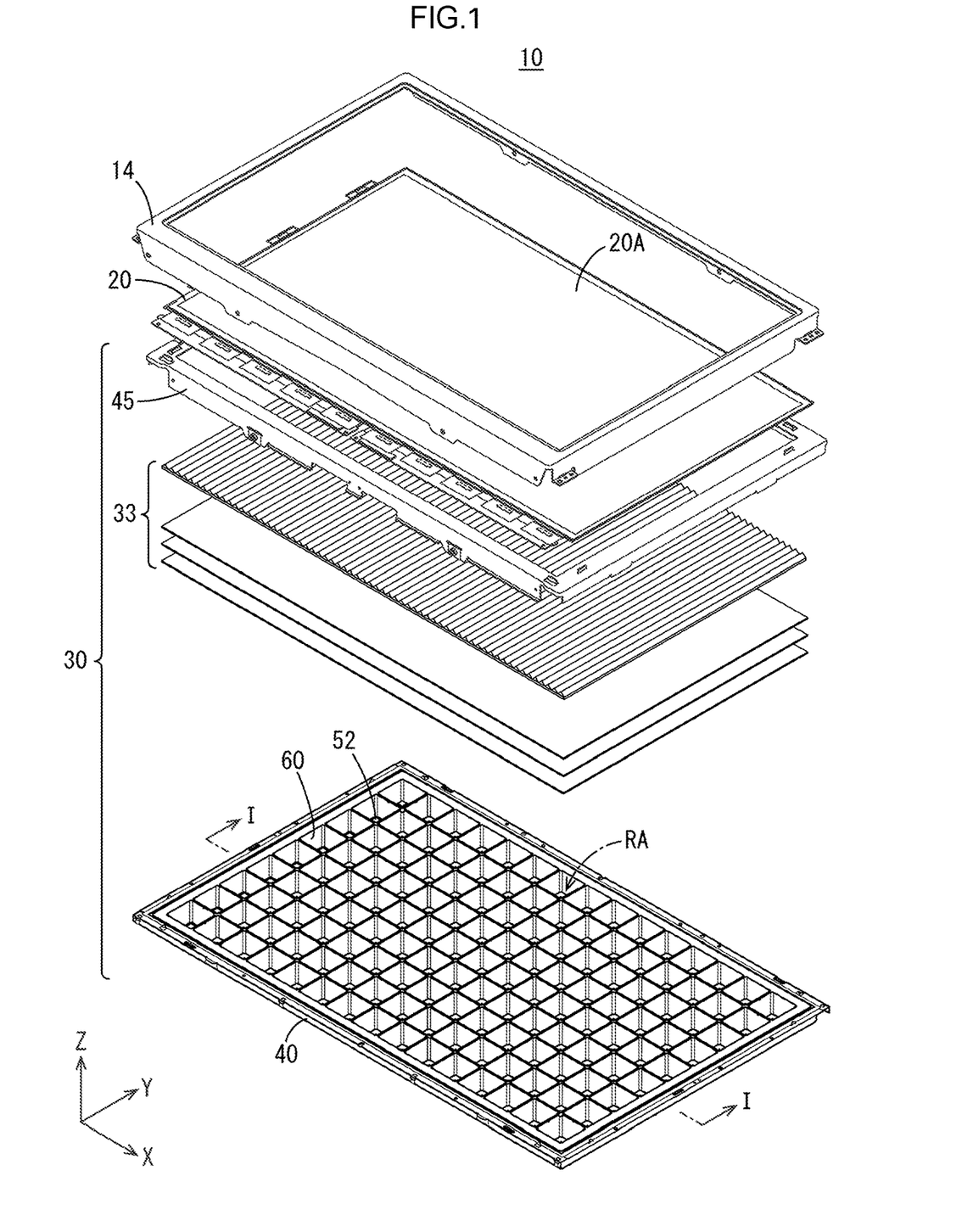
FIG. 1 is an exploded perspective view of a liquid crystal display device according to one embodiment.

As illustrated in FIG. 1, the liquid crystal panel 10 includes the liquid crystal panel 20 (a display panel) that displays an image, the backlight unit 30 (the lighting device) that supplies light to the liquid crystal panel 20, and a bezel 14. The liquid crystal panel 20 is held between the bezel 14 and a frame 45 of the backlight unit 30 with a display surface 20A, which can display an image, facing the front side. The liquid crystal panel 20, the backlight unit 30, and the liquid crystal display device 10 have a laterally long rectangular shape as a whole, and a long-side direction, a short-side direction, and a thickness direction match the X-axis direction, the Y-axis direction, and the Z-axis direction, respectively, in each drawing. The illustrated shape of the devices is one example and the liquid crystal panel 20, the backlight unit 30, and the liquid crystal display device 10 may have a vertically long rectangular shape.

As illustrated in FIG. 1, the bezel 14 is a support member that is disposed on the front side with respect to the liquid crystal panel 20. The bezel 14 extends along a front-side outer peripheral portion of the liquid crystal panel 20 and is configured as a front-side outer form of the liquid crystal display device 10. The bezel 14 is made of metal having good rigidity such as stainless steel and aluminum.

Figure 2:
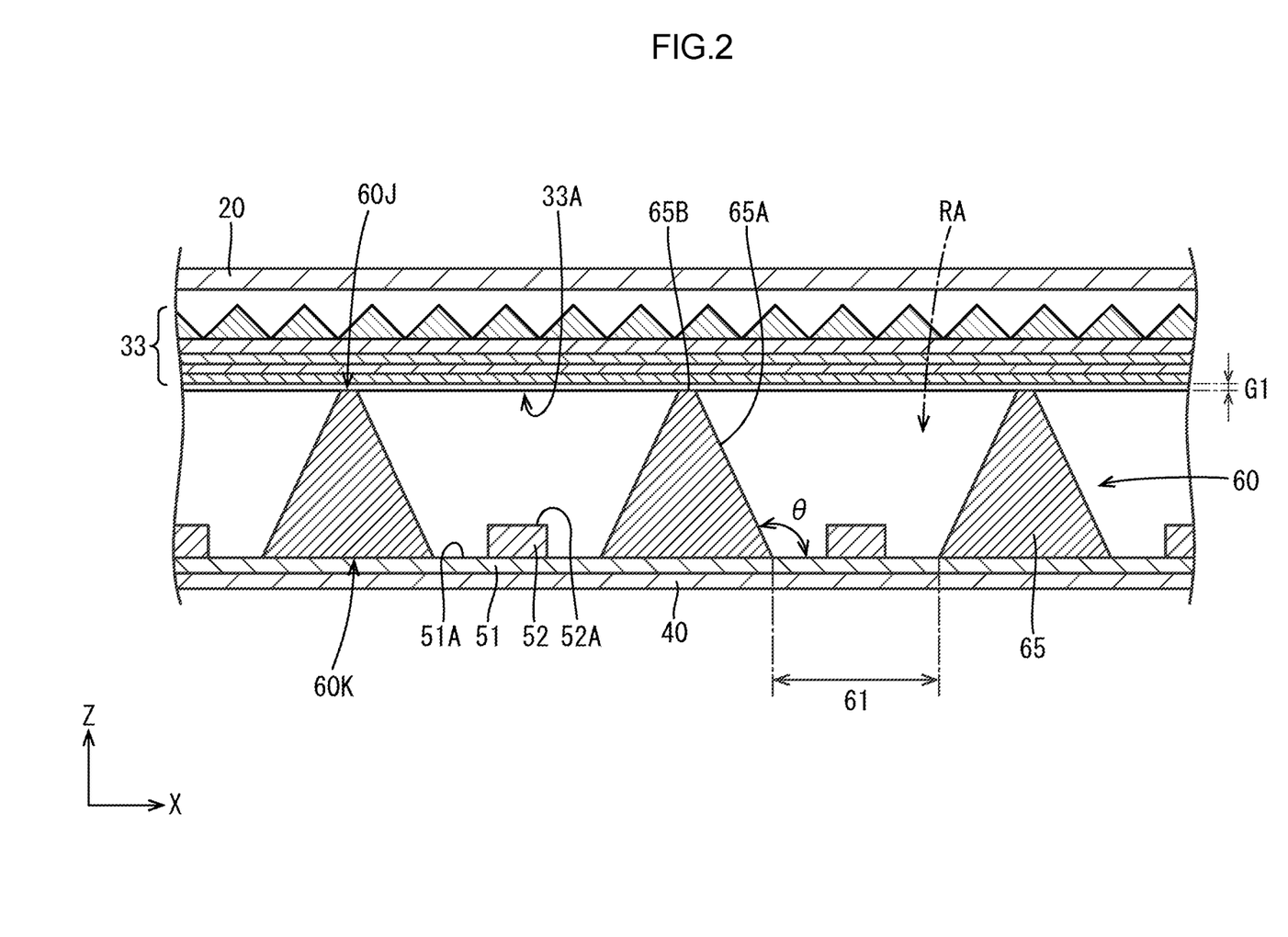
FIG. 2 is a magnified cross-sectional view taken along line I-I in FIG. 1.

As illustrated in FIGS. 1 and 2, the backlight unit 30 includes LEDs 52 (light sources), a LED board 51 (board) on which the LEDs 52 are mounted, various kinds of optical sheets 33, a reflection member 60, a chassis 40, and a frame 45. The LEDs 52 are arranged in a planar area on the back side with respect to (below) the liquid crystal panel 20. The backlight unit 30 is a so-called direct type backlight unit.

The chassis 40 has a shape of a laterally long rectangular shallow tray that opens toward a light exit side (the front side, toward the liquid crystal panel 20). The LED board 51 (refer to FIG. 3) is disposed on a bottom of the chassis 40. The chassis 40 is made of metal, for example, such as stainless steel and aluminum. The frame 45 is made of resin such as white or black polycarbonate.

The bezel 14, the frame 45, and the chassis 40 hold the liquid crystal panel 20 and the backlight unit 30. A tape member may be attached to the bezel 14 and the frame 45 for fixing and shielding light. The bezel 14 and the frame 45 may not have a frame shape. One of the bezel 14 and the frame 45 may not be included.

Figure 3:
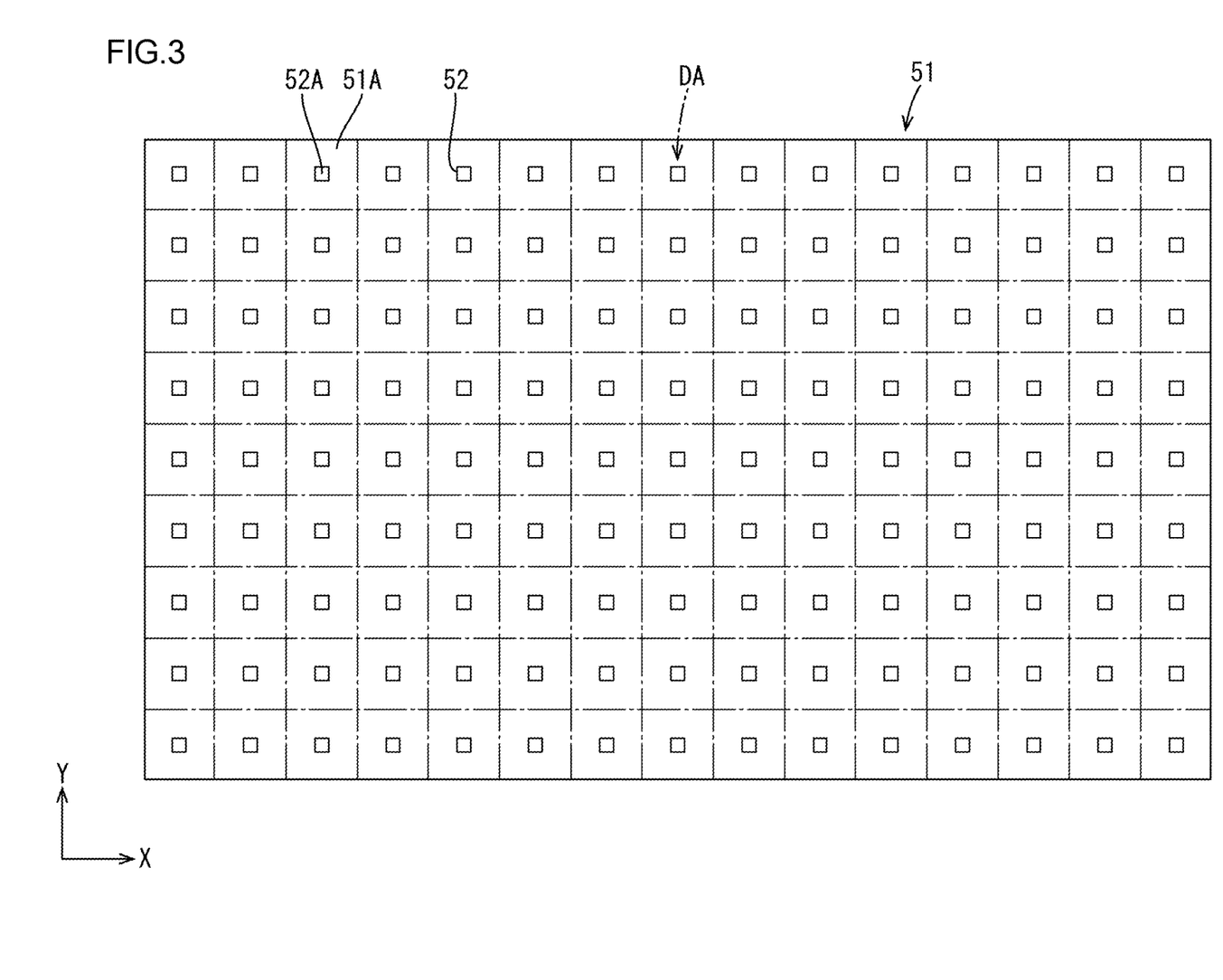
FIG. 3 is a plan view illustrating LEDs and a LED board.

As illustrated in FIGS. 1 and 3, the LEDs 52 are arranged in a matrix on a front surface (mount surface 51A) of the rectangular LED board 51. The LEDs 52 are arranged in the X-axis direction (a row direction) and the Y-axis direction (a column direction) at equal intervals. The LED 52 has a cuboid shape and is disposed on the mount surface 51A with a bottom surface of the LED 52 and an upper surface of the LED 52 that is an opposite surface of the bottom surface is a light emitting surface 52A. The LEDs 52 are so-called top view type LEDs. An optical axis of light emitted by the LED 52 corresponds to the Z-axis direction. The optical axis represents a traveling direction of light rays that have highest light intensity (a peak) among the light rays emitted by the LED 52.

The LEDs 52 are preferably configured to emit white light. The LED 52 may include a small size packaging such as chip scale package (CSP) or flip chip package. The LED 52 may be a mini LED or a micro LED that has a small area of the light emitting surface 52A, which is about 1.0 mm$^2$ or smaller. With the LEDs 52 emitting light of a single color (for example, blue light), the backlight unit includes a wavelength conversion sheet (a color conversion sheet) to exit synthesized light (mixed light) of white. The kind of wavelength conversion sheet is not particularly limited to any specific one as long as the wavelength conversion sheet can convert primary light into secondary light that is included in a wavelength region different from that of the primary light. For example, the wavelength conversion sheet may include quantum dot phosphors, inorganic phosphors, or organic phosphors.

The LED board 51 has a laterally rectangular shape and includes a base member and a wire pattern, which is made of electrically conductive material, on the base member. The LED board 51 may be an aluminum board or glass epoxy board but may be a flexible printed circuit (FPC) board having good flexibility.

Figure 4:
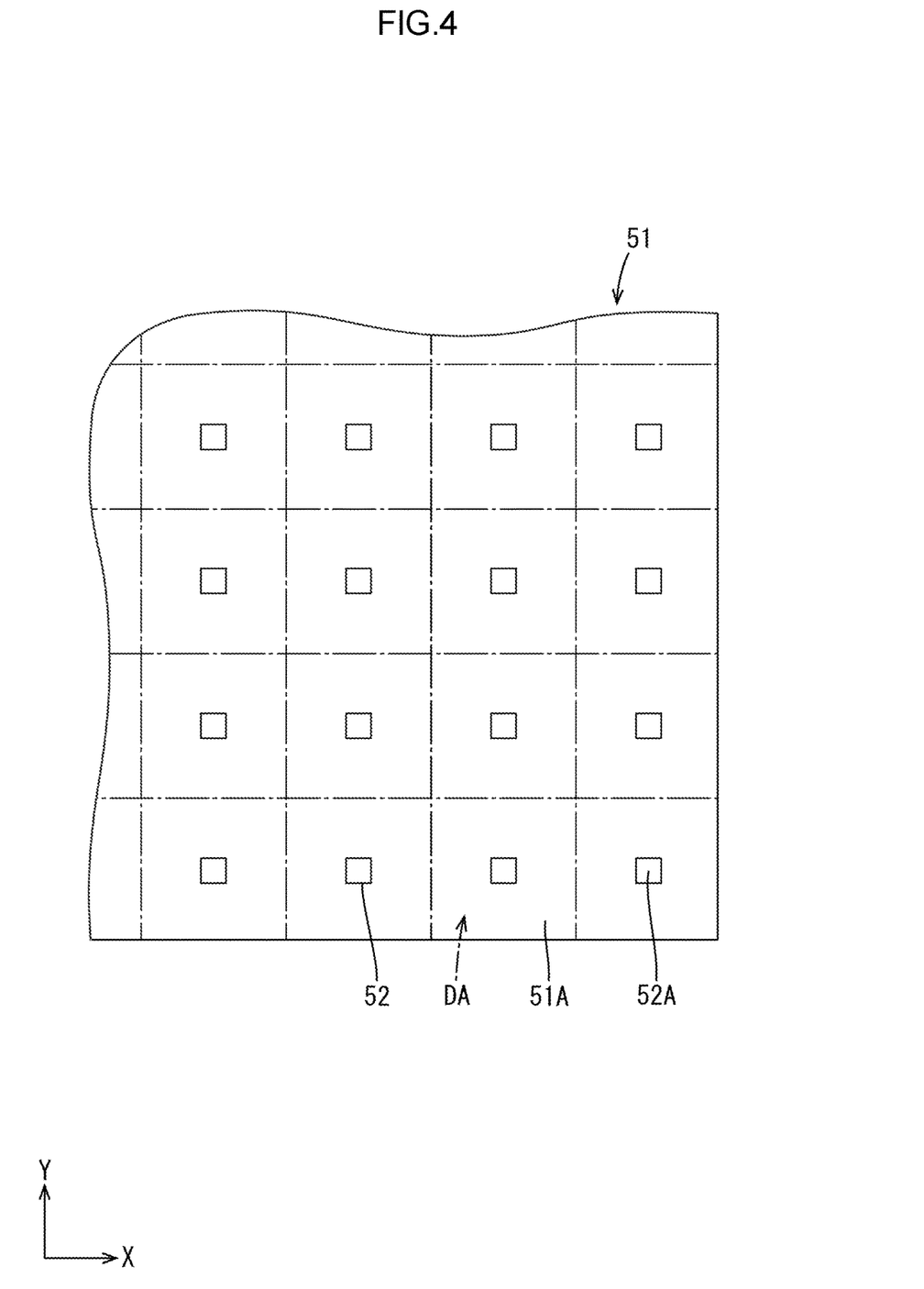
FIG. 4 is a magnified view of a lower right portion of the LED board in FIG. 3.
Figure 5:
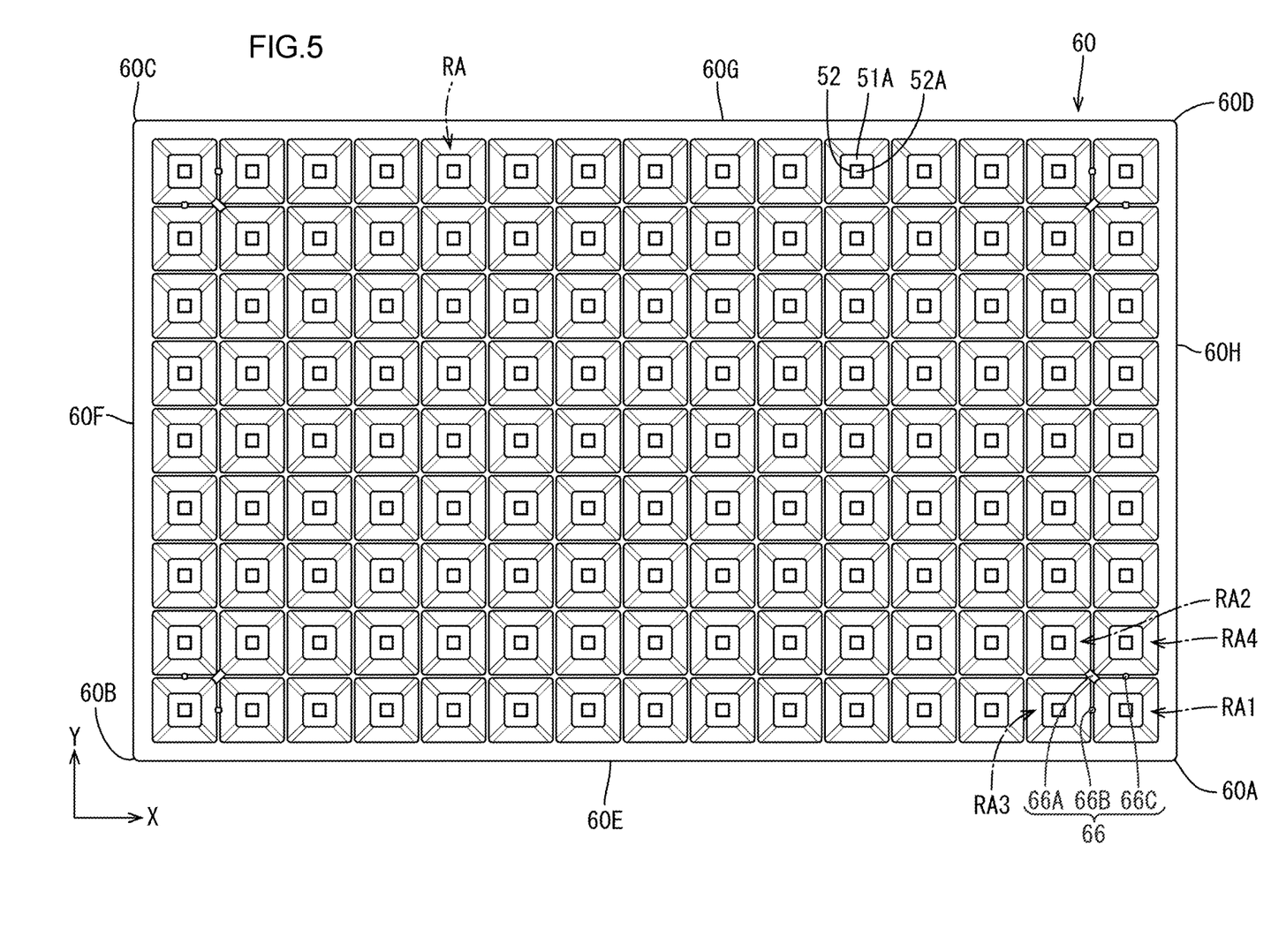
FIG. 5 is a plan view illustrating the LEDs, the LED board, and a reflection member.

As illustrated in FIGS. 3 and 4, the mount surface 51A of the LED board 51 is divided into dimming areas DA (segment areas) that are arranged in rows and columns without having any space therebetween. In this embodiment, each dimming area DA has a rectangular shape and the LED 52 is arranged in a center of each dimming area DA. The size of the dimming area DA is defined such that at least one LED 52 can be disposed. A size of each dimming area DA and the number of LEDs 52 included in each dimming area DA can be changed according to the screen size, the way of using, and the required precision of the liquid crystal panel 20.

The LEDs 52 are supplied with driving power from an external power source via the wire pattern formed on the LED board 51. The wire pattern is configured such that supply of driving power to the LEDs 52 is controlled for each dimming area DA independently. Namely, the backlight unit 30 performs local dimming driving. A controller included in the liquid crystal display device 10 controls supply of the driving power. Thus, the amount of light rays emitted by the LED 52 can be independently controlled for each dimming area DA. The backlight unit 30 and the liquid crystal display device 10 can adjust brightness with high precision and high contrast and reduce power consumption by performing local dimming driving.

The optical sheets 33 have a laterally long rectangular shape as illustrated in FIG. 1. The optical sheets 33 are disposed between the reflection member 60 and the liquid crystal panel 20 and add optical effects to the light emitted by the LEDs 52. Various kinds of optical sheets 33 have been known and one kind or several kinds of optical s 33 are appropriately used according to the way of using the liquid crystal display device 10.

With the optical sheets 33 including a light diffusion sheet, the light is diffused and evenness of brightness within a surface area can be enhanced. The thickness of the light diffusion sheet is from about 30 μm to about 3 mm. With the optical sheets 33 including a brightness enhancement sheet, the light collecting effect is added to the exit light and front brightness can be enhanced. Brightness Enhancement Film (BEF: registered trademark) and Dual Brightness Enhancement Film (DBEF: registered trademark) made by 3M can be used as the brightness enhancement sheet. Other examples of the optical sheets 33 include a dichroic sheet (a dichroic filter), a turning lens sheet, and a prism sheet (an optical sheet that has prisms or lenses but is not a brightness enhancement sheet or a turning lens sheet).

As illustrated in FIGS. 5 to 8, the reflection member 60 is disposed on the mount surface 51A of the LED board 51 and entirely cover the mount surface 51A from the front side. The reflection member 60 has a laterally long rectangular plan view shape. The reflection member 60 has four corner portions 60A, 60B, 60C, 60D and four edge portions 60E, 60F, 60G, 60H. The reflection member 60 is made of resin such as white polycarbonate having good light reflectance. The reflection member 60 integrally includes the corner portions 60A, 60B, 60C, 60D and the edge portions 60E, 60F, 60G, 60H.

Figure 8:
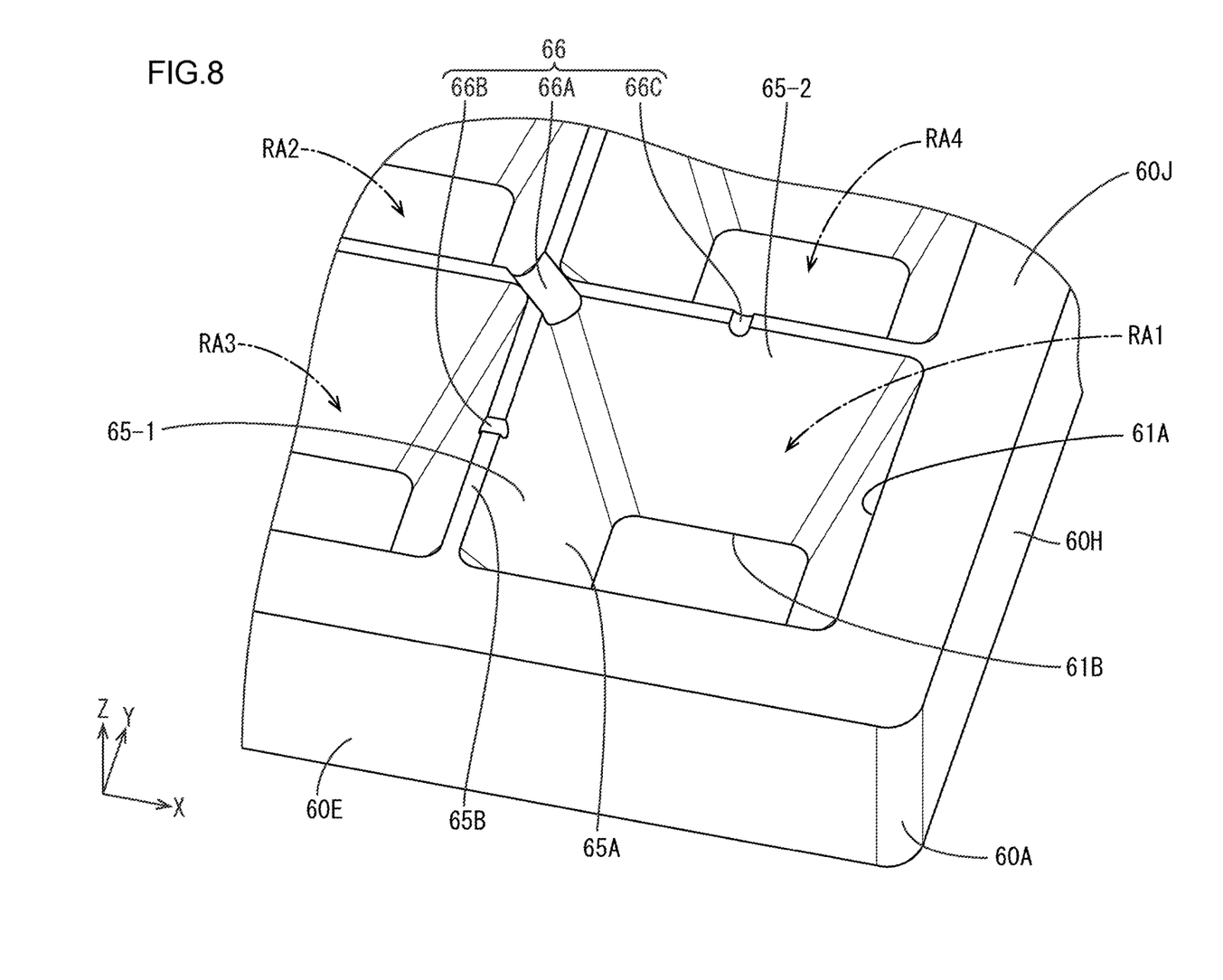
FIG. 8 is a magnified perspective view of a corner portion of the reflection member in FIG. 7.

The reflection member 60 is a sheet member having a front surface 60J and a back surface 60K. The reflection member 60 includes insertion holes 61 and wall portions 65. The insertion holes 61 are between the wall portions 65 and extend from the front surface 60J to the back surface 60K. As illustrated in FIG. 8, the insertion hole 61 has an opening edge 61A on the front surface 60J and an opening edge 61B on the back surface 60K. An opening size at the opening edge 61B is smaller than an opening size at the opening edge 61A. Each of the insertion holes 61 has an opening shape and the opening size at the opening edge 61B such that at least one LED 52 can be inserted therein. The insertion holes 61 of this embodiment has a rectangular shape and has a size such that one LED 52 can be inserted therein. In the drawings, the LED 52 and the portion of the mount surface 51A of the LED board 51 near the LED 52 are exposed to the front side through the insertion hole 61. Namely, the opening size at the opening edge 61B is larger than the LED 52; however, the insertion hole 61 may have a same size as the LED 52 such that only the light emitting surface 52A of the LED 52 can be exposed from the insertion hole 61.

With the reflection member 60 being configured such that a portion of the mount surface 51A of the LED board 51 being exposed through the insertion hole 61, a reflection sheet may be disposed between the mount surface 51A and the reflection member 60 to cover the exposed portion of the mount surface 51A. With the reflection sheet, the reflectance can be further increased. The reflection sheet may be a white resin sheet made of polyester resin or PET resin such as enhanced specular reflector (ESR).

The wall portions 65 of the reflection member 60 extend to surround at least one insertion hole 61. In this embodiment, four wall portions 65 surround one insertion hole 61 and one LED 52 that is inserted in the one insertion hole 61. However, four wall portions may surround the LEDs 52 by surrounding multiple insertion holes 61 in which the LEDs 52 are inserted, respectively, or surrounding one insertion hole in which multiple LEDs 52 are inserted.

The surface area of the reflection member 60 is divided into reflection areas RA by the wall portions 65. The reflection areas RA are arranged in a grid. The reflection areas RA preferably correspond to the dimming areas DA used for the local dimming driving. In this embodiment, one reflection area RA corresponds to one dimming area DA and the reflection area RA and the dimming area DA have a substantially same size.

Figure 6:
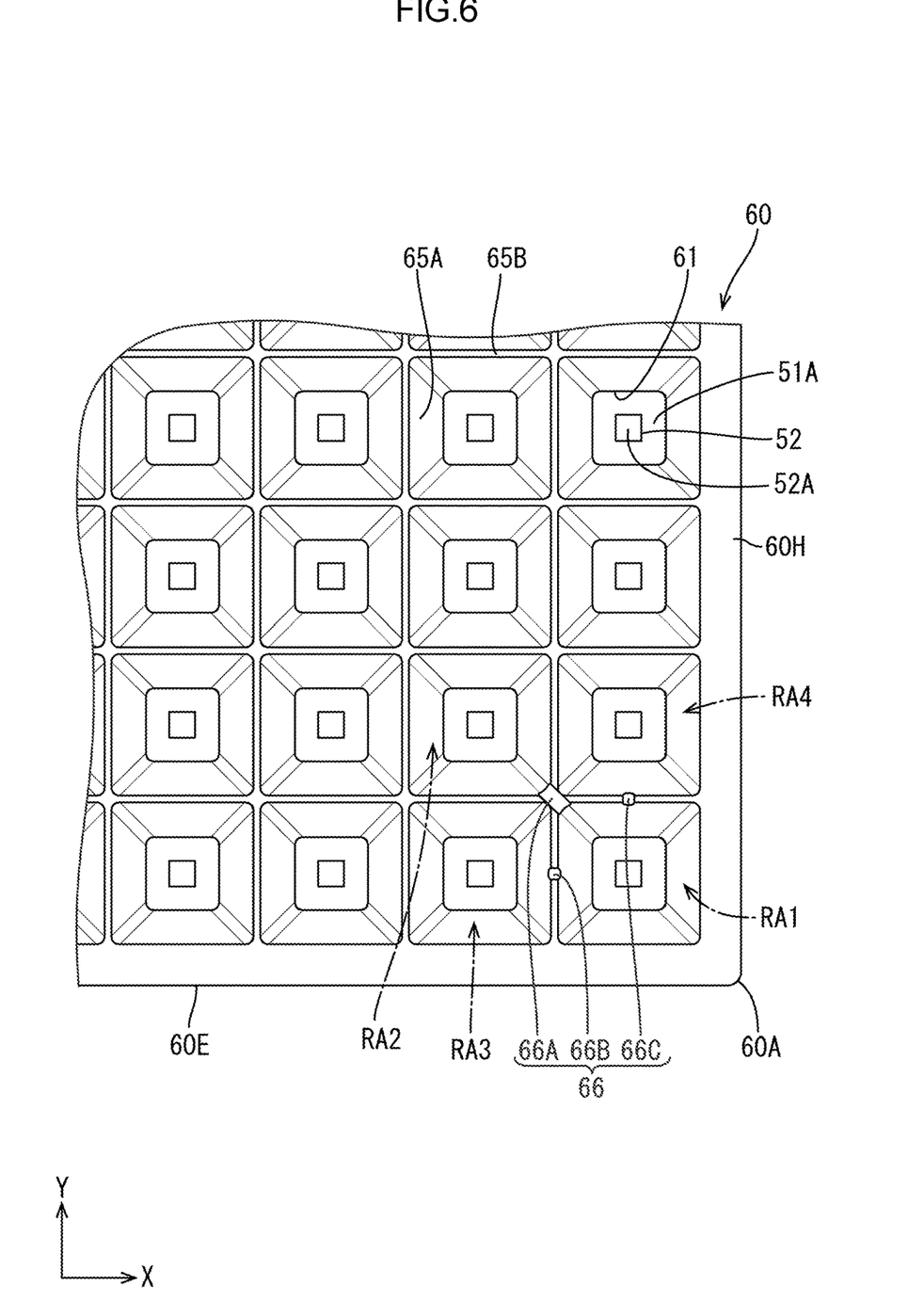
FIG. 6 is a magnified view of a lower right portion of the reflection member in FIG. 5.
Figure 7:
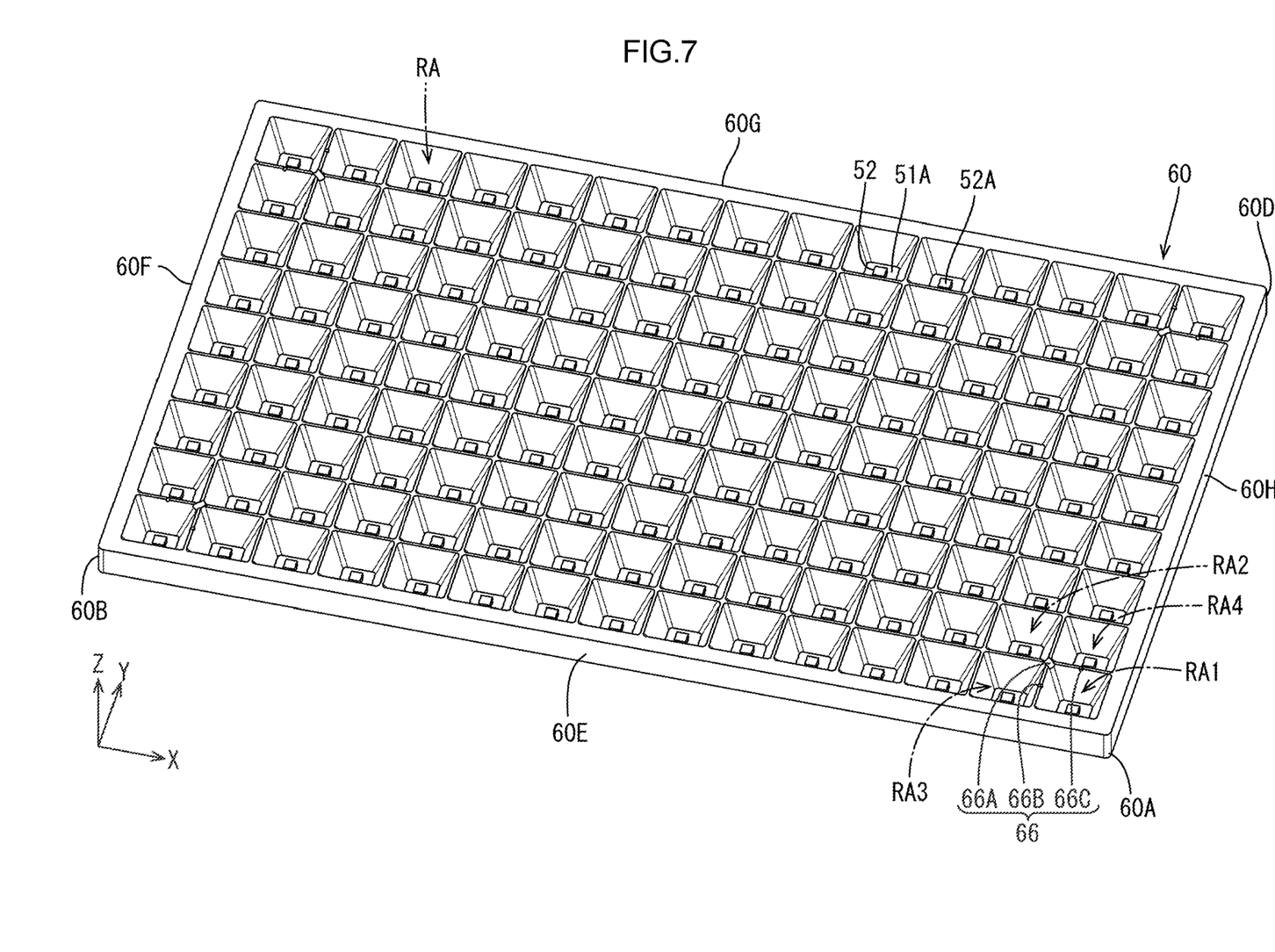
FIG. 7 is a perspective plan view illustrating the LEDs, the LED board, and the reflection member.

As illustrated in FIGS. 6 and 8, the reflection areas RA include first reflection areas RA1 that are disposed at the corner portions 60A, 60B, 60C, 60D of the reflection member 60. The reflection areas RA include a second reflection area RA2, a third reflection area RA3, and a fourth reflection area RA4. The second reflection area RA2 is diagonally next to the first reflection area RA1. The third reflection area RA3 is next to the first reflection area RA1 with respect to the X-axis direction (the row direction). The fourth reflection area RA4 is next to the first reflection area RA1 with respect to the Y-axis direction (the column direction). The LEDs 52 include a first LED 52 that is disposed in the first reflection area RA1, a second LED 52 that is disposed in the second reflection area RA2, a third LED 52 that is disposed in the third reflection area RA3, and a fourth reflection area RA4. The first LED 52 is surrounded by the wall portions 65 in the first reflection area RA1. The second LED 52 is surrounded by the wall portions 65 in the second reflection area RA2. The third LED 52 is surrounded by the wall portions 65 in the third reflection area RA3. The fourth LED 52 is surrounded by the wall portions 65 in the fourth reflection area RA4.

The wall portion 65 has two inclined surfaces 65A that extend toward the front side from the LED board 51 side. As illustrated in FIGS. 2 and 8, the inclined surfaces 65A that are opposite each other become farther away from each other as they extend from the back surface 60K to the front surface 60J. Two pairs of opposing inclined surfaces 65A, which form a square pyramid shape, surround one LED 52. The light rays emitted by the LED 52 and reach the inclined surface 65A reflect off the inclined surface 65A toward the front side. By adjusting the angle between the inclined surface 65A and the mount surface 51A, the direction in which the reflected light rays travel can be adjusted. As illustrated in FIG. 2, the inclination angle θ between the inclined surface 65A and the mount surface 51A of the LED board 51 is greater than 90 degrees and may be preferably as great as possible such that the space surrounded by the walls 65 increases toward the front side.

As illustrated in FIG. 2, the wall portion 65 is away from a back surface 33A of the optical sheet 33 and a gap G1 is between a front-side top portion 65B of the wall portion 65 and the back surface 33A. No gap may be between the front-side top portion 65B of the wall portion 65 and the back surface 33A of the optical sheet 33. With the gap G1, the light rays that are emitted by one LED 52 surrounded by the wall portions 65 are likely to be mixed with the light rays that are emitted by another LED 52 that is adjacent to the one LED 52. Namely, the light rays are likely to travel between the adjacent reflection areas RA. Even without the gap G1, the light rays exiting the adjacent reflection areas RA are mixed through the optical sheets 33 before reaching the liquid crystal panel 20 and spread within the surface area of the liquid crystal panel 20.

As illustrated in FIGS. 6 and 8, the wall portion 65 included in the first reflection area RA1 includes a passing portion 66. The light rays emitted by the LEDs 52 that are adjacent to each other via the wall portion 65 pass through the passing portion 66 of the wall portion 65. The passing portion 66 of this embodiment is a groove in the front surface 60J (the surface opposite from the surface facing the LED board 51) of the wall portion 65. The groove of the passing portion 66 has a semicircular cross-sectional shape in FIG. 8; however, the groove of the passing portion 66 does not necessarily have the semicircular cross-sectional shape.

The passing portion 66 includes a first passing portion 66A, a second passing portion 66B, and a third passing portion 66C. As illustrated in FIG. 8, the wall portions 65 included in the first reflection area RA1 include a wall portion 65-1 and a wall portion 65-2. The wall portion 65-1 extends parallel to the edge portion 60H and is between the first reflection area RA1 and the third reflection area RA3. The wall portion 65-2 extends parallel to the edge portion 60E and is between the first reflection area RA1 and the fourth reflection area RA4. The wall portion 65-1 includes the second passing portion 66B and the wall portion 65-2 includes the third passing portion 66C. The first passing portion 66A extends from a corner of the opening edge 61A in the first reflection area RA1 to a corner of the opening edge 61A in the second reflection area RA2. The light rays emitted by the LEDs 52 that are next to each other in a diagonal direction via the joint portion of the wall portions 65-1, 65-2 can pass through the first passing portion 66A. The light rays emitted by the LEDs 52 that are next to each other in the X-axis direction (the row direction) via the wall portion 65-1 can pass through the second passing portion 66B. The light rays emitted by the LEDs 52 that are next to each other in the Y-axis direction (the column direction) via the wall portion 65-2 can pass through the third passing portion 66C. The passing portion 66 preferably includes at least the first passing portion 66A.

With the first passing portion 66A, the amount of light rays that travel between the first reflection area RA and the second reflection area RA2 increases. With the second passing portion 66B, the amount of light rays that travel between the first reflection area RA1 and the third reflection area RA3 increases. With the third passing portion 66C, the amount of light rays that travel between the first reflection area RA1 and the fourth reflection area RA4 increases. A large amount of light rays travel to the first reflection area RA1, which has lowest brightness, from the LEDs 52 that are adjacent to the first reflection area RA1. This enhances brightness in the first reflection area RA1. As a result, brightness of the corner portions 60A, 60B, 60C, 60D of the reflection member 60 can be enhanced and brightness of the corner portions of the backlight unit 30 can be enhanced. Therefore, uneven brightness can be less likely to be caused.

The number of LEDs 52 that are adjacent to the third reflection area RA3 and the number of LEDs 52 that are adjacent to the fourth reflection area RA4 are smaller than the number of LEDs 52 that are adjacent to the second reflection area RA2. More specifically, each of the third LED 52 in the third reflection area RA3 and the fourth LED 52 in the fourth reflection area RA4 is adjacent to five LEDs 52. The second LED 52 in the second reflection area RA2 is adjacent to eight LEDs 52. Therefore, if the amount of light rays traveling from the third reflection area RA3 and the fourth reflection area RA4 to the first reflection area RA1 is excessively great, the third reflection area RA3 and the fourth reflection area RA4 become too dark and this may cause uneven brightness. The amount of light rays that can pass through the second passing portion 66B and the amount of light rays that can pass through the third passing portion 66C are preferably smaller than the amount of light rays that can pass through the first passing portion 66A. The size of the grooves of the first passing portion 66A, the second passing portion 66B, and the third passing portion 66C are determined to achieve the amounts of light rays passing through the first, second, and third passing portions 66A, 66B, 66C, respectively, as described above. Specifically, as illustrated in FIGS. 6 and 8, the size of grooves of the second passing portion 66B and the third passing portion 66C is preferably smaller than that of the first passing portion 66A.

Accordingly, the amount of light rays traveling between the first reflection area RA1 and the third reflection area RA3 and the amount of light rays traveling between the first reflection area RA1 and the fourth reflection area RA4 can be appropriately maintained to be small. Namely, the light rays emitted by the LED 52 that is in the third reflection area RA3 and adjacent to the first reflection area RA1 in the row direction and the light rays emitted by the LED 52 that is in the fourth reflection area RA4 and adjacent to the first reflection area RA1 in the column direction can travel through the second passing portion 66B and the third passing portion 66C, respectively, such that the amount of light rays traveling through the second passing portion 66B and the third passing portion 66C can be appropriately adjusted not to be excessively large.

The first LED 52, the second LED 52, the third LED 52, and the fourth LED 52 that are disposed in the first reflection area RA1, the second reflection area RA2, the third reflection area RA3, and the fourth reflection area RA4, respectively, preferably have light emission intensity that is greater than the light emission intensity of other LEDs 52. Specifically, the light emission intensity may be controlled by changing the current supplied to each LED 52 according to the shading in performing the local dimming driving. If the LEDs 52 are driven with pulse width modulation (PWM), the light emission intensity may be controlled by changing the duty ratio of the PWM signals in performing the local dimming driving. The light emission intensity may be controlled with using LEDs 52 of various different types. Accordingly, brightness in the corner portions of the backlight unit 30 can be further enhanced and the uneven brightness can be suppressed more effectively.

Second Embodiment

Figure 9:
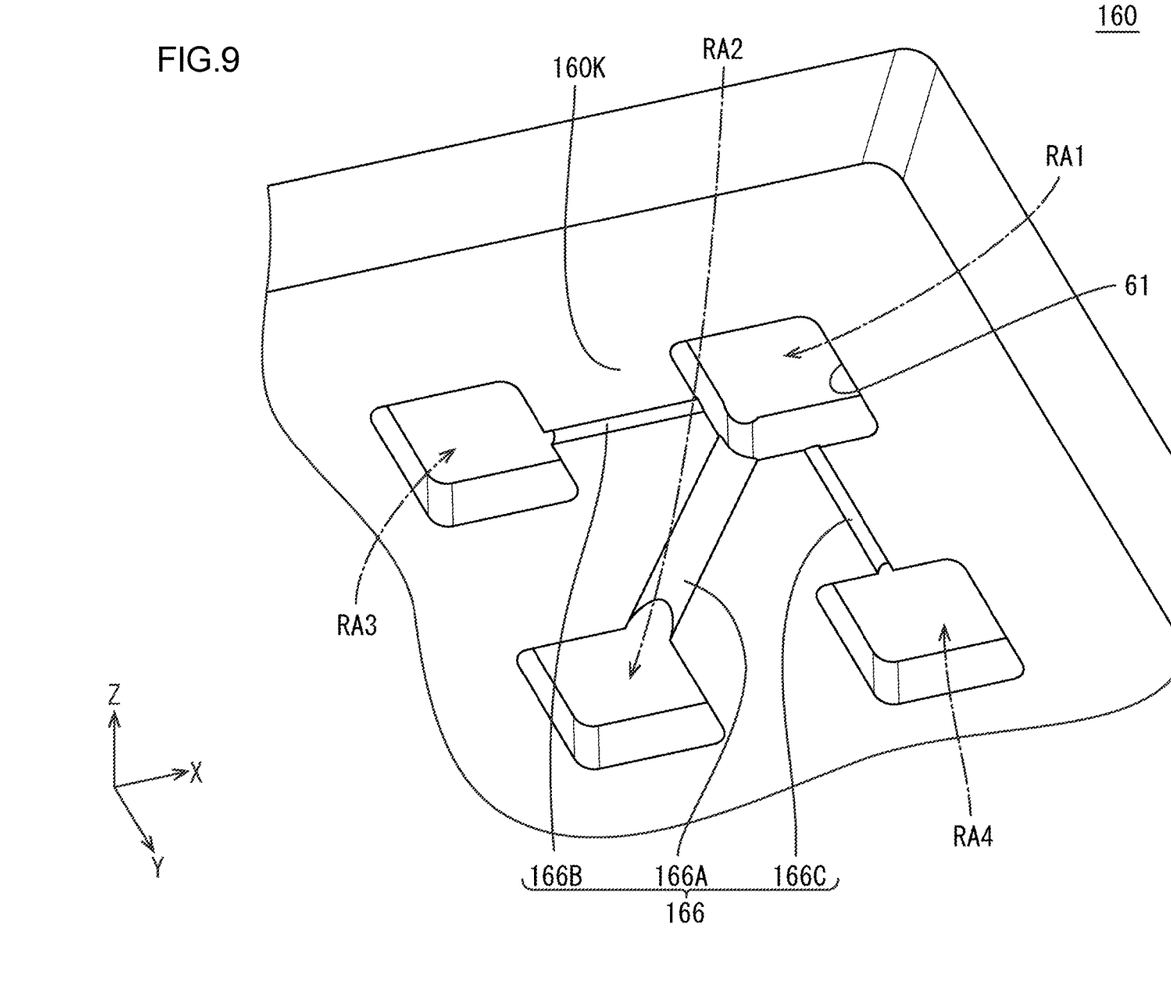
FIG. 9 is a perspective view illustrating a corner portion of a reflection member according to another embodiment seen from a back side (a LED board side).

A reflection member 160 according to a second embodiment will be described with reference to FIG. 9. Configurations, operations, and effects of the second embodiment that are similar to those of the first embodiment may not be described.

The reflection member 160 of this embodiment includes a passing portion 166 on a back surface 160K (that is opposite the LED board 51) corresponding to wall portions. The passing portion 166 includes grooves formed in the back surface 160K of the reflection member 160 corresponding to the wall portions. The grooves of the passing portion 166 have a semicircular cross-sectional shape in FIG. 9; however, the grooves of the passing portion 166 does not necessarily have the semicircular cross-sectional shape. The passing portion 166 includes a first passing portion 166A, a second passing portion 166B, and a third passing portion 166C. A size of the second passing portion 166B and the third passing portion 166C is preferably smaller than that of the first passing portion 166A.

Third Embodiment

Figure 10:
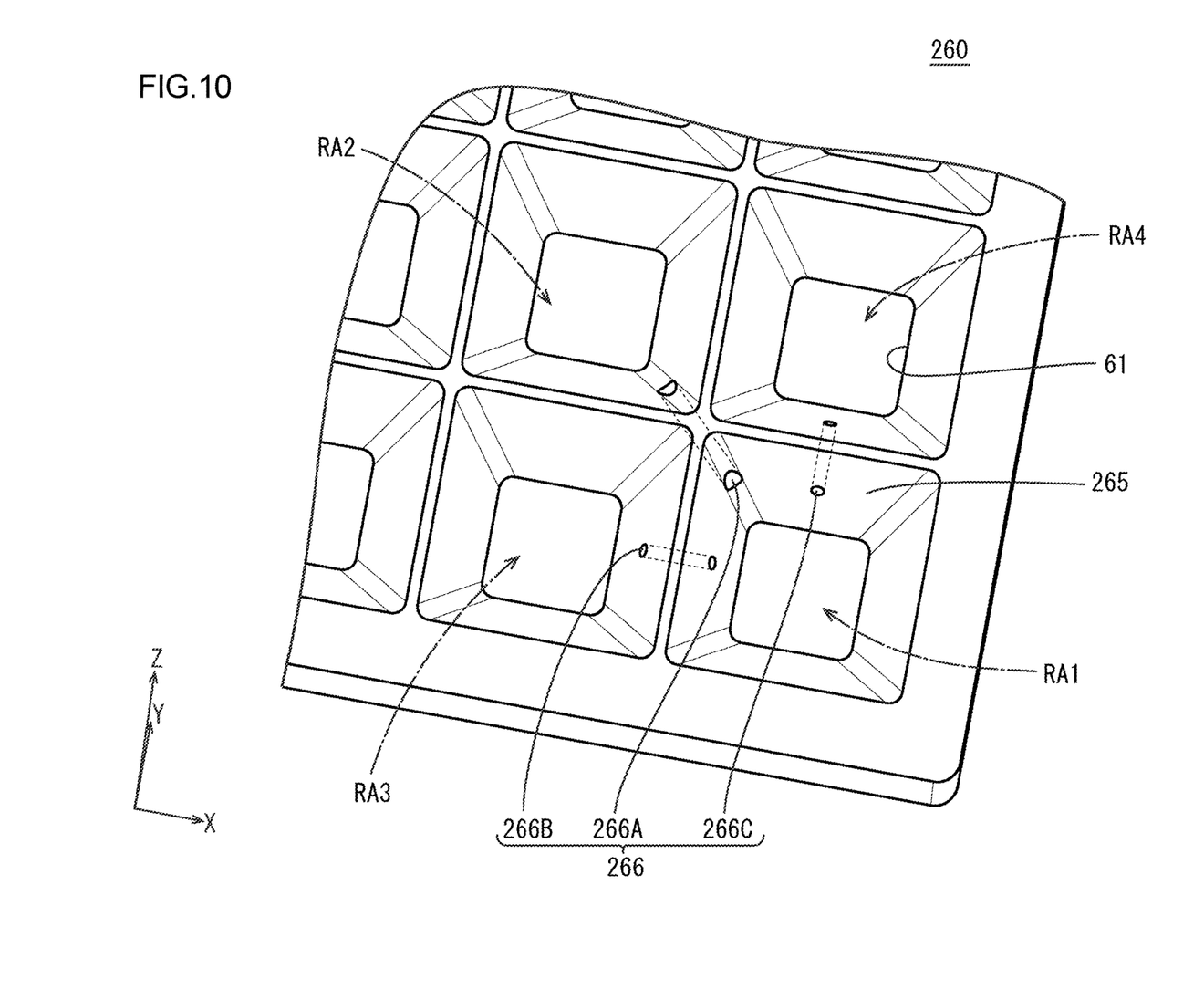
FIG. 10 is a perspective view illustrating the corner portion of the reflection member according to another embodiment seen from a front side (a display panel side).

A reflection member 260 according to a third embodiment will be described with reference to FIG. 10. Configurations, operations, and effects of the third embodiment that are similar to those of the first and second embodiments may not be described.

The reflection member 260 includes a passing portion 266 in a wall portion 265. The passing portion 266 includes a through hole that is through the wall portion 265. The through hole is a circular hole in FIG. 10; however, the shape of the through hole is not limited thereto. The passing portion 266 includes a first passing portion 266A, a second passing portion 266B, and a third passing portion 266C. The first passing portion 266A is a through hole that is through the wall portion 265 between the first reflection area RA1 and the second reflection area RA2. The second passing portion 266B is a through hole that is through the wall portion 265 between the first reflection area RA1 and the third reflection area RA3. The third passing portion 266C is a through hole that is through the wall portion 265 between the first reflection area RA1 and the fourth reflection area RA4. A size of the through holes of the second passing portion 266B and the third passing portion 266C is preferably smaller than that of the through hole of the first passing portion 266A.

Fourth Embodiment

Figure 11:
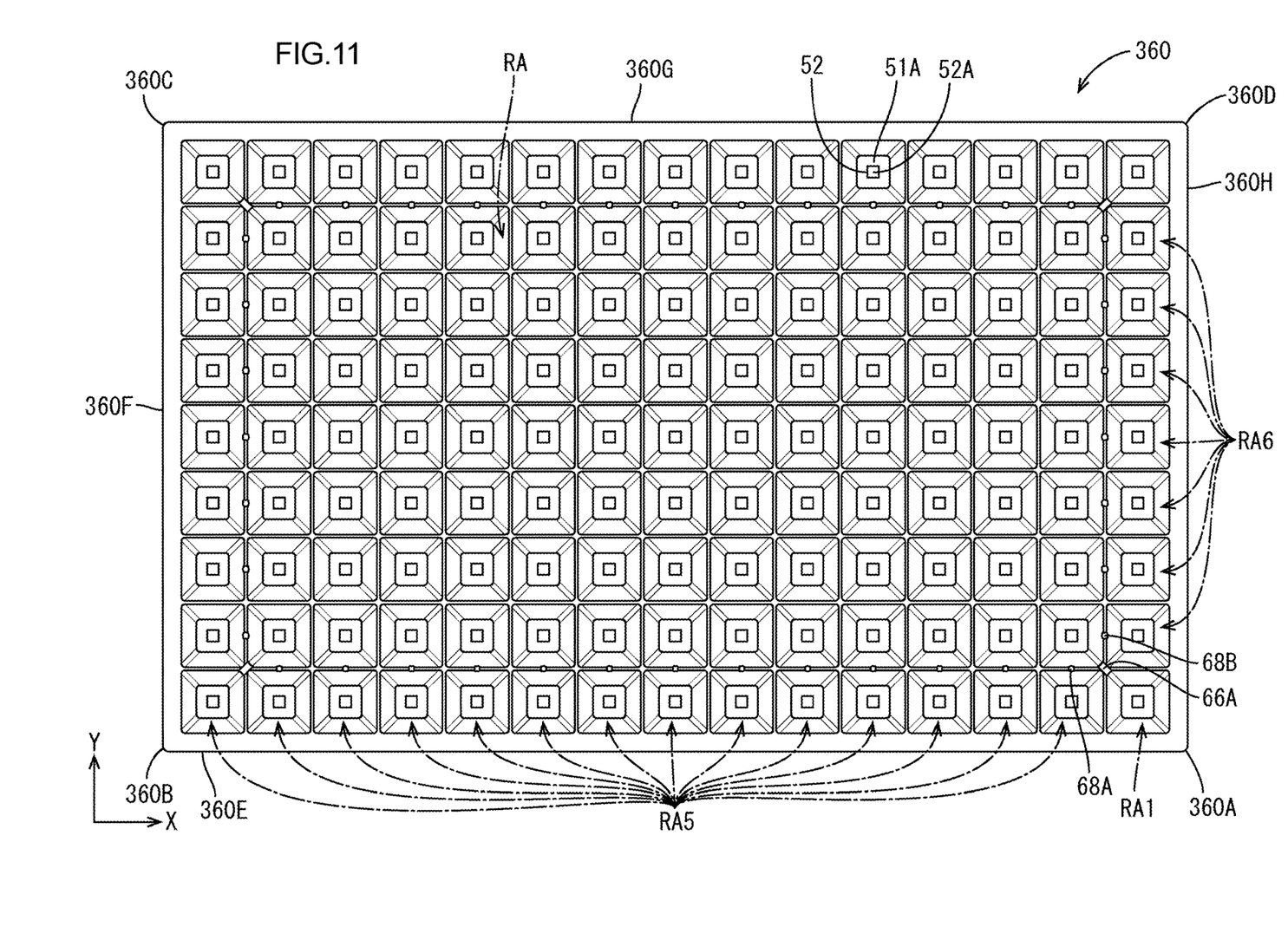
FIG. 11 is a plan view illustrating LEDs, an LED board, and a reflection member according to another embodiment.
Figure 12:
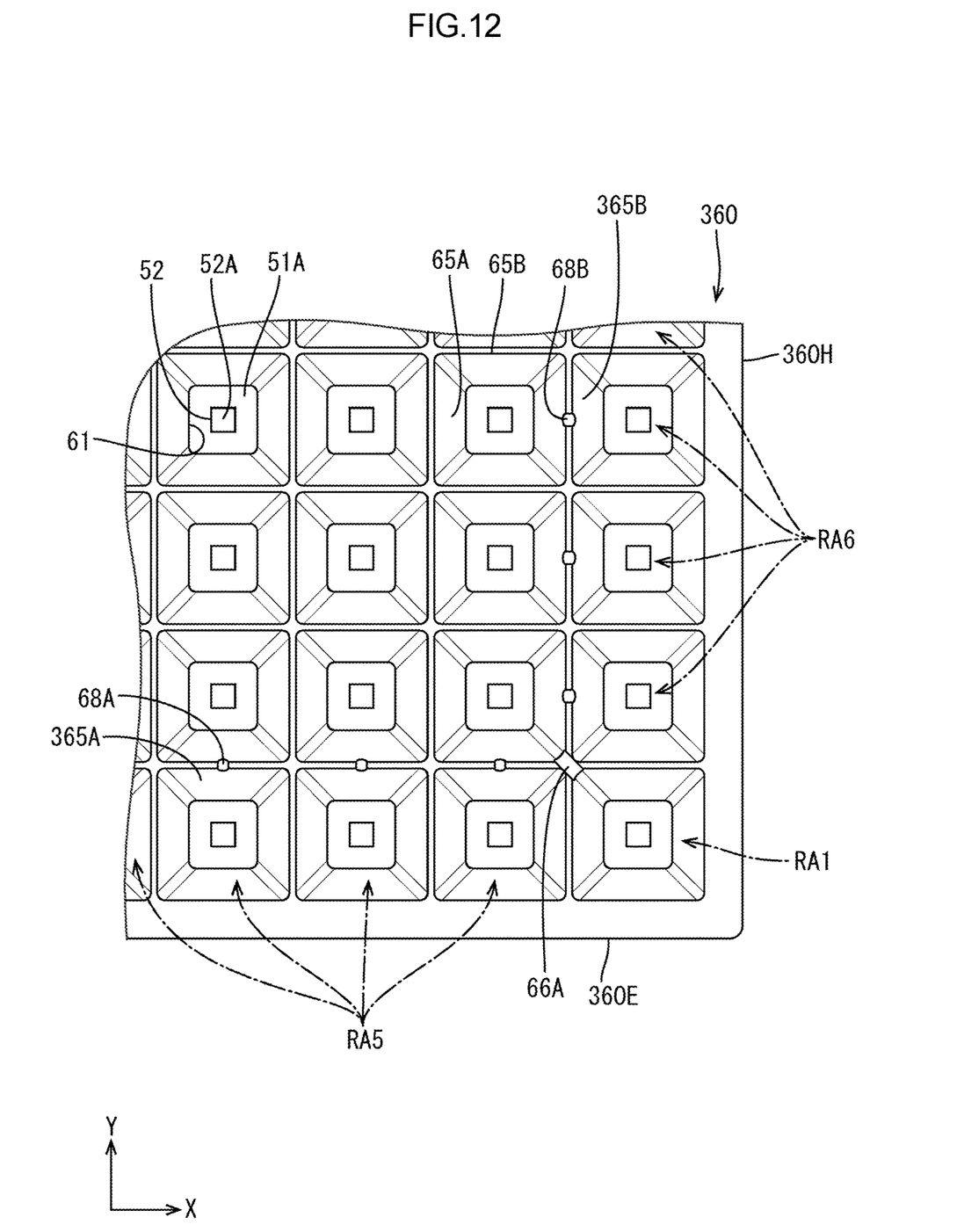
FIG. 12 is a magnified view of a right lower portion of the reflection member in FIG. 11.

A reflection member 360 according to a fourth embodiment will be described with reference to FIGS. 11 and 12. Configurations, operations, and effects of the fourth embodiment that are similar to those of the first to third embodiments may not be described.

The reflection areas RA include the first reflection areas RA1, row reflection areas RA5, and column reflection areas RA6. The first reflection areas RA1 are at corner portions 360A, 360B, 360C, 360D. The row reflection areas RA5 are at first edge portions 360E, 360G, which are opposite each other, and arranged along the first edge portions 360E, 360G. The column reflection areas RA6 are at second edge portions 360F, 360H, which are opposite each other, and arranged along the second edge portions 360F, 360H.

The reflection member 360 includes fourth passing portions 68A (row passing portions) in wall portions 365A (row wall portions) of the row reflection areas RA5 and fifth passing portions 68B (column passing portions) in wall portions 365B (column wall portions) of the column reflection areas RA6. The fourth passing portions 68A are in the respective row reflection areas RA5. The fifth passing portions 68B are in the respective column reflection areas RA5. The wall portions 365A are between the row reflection areas RA5 and the reflection areas that are next to the respective row reflection areas RA5 in the column direction. The wall portions 365B are between the column reflection areas RA6 and the reflection areas that are next to the respective column reflection areas FA6 in the row direction. The light rays emitted by the LED 52 that is in the reflection area adjacent to the row reflection area RA5 via the wall portion 365A travel through the fourth passing portion 68A to the row reflection area RA5. The light rays emitted by the LED 52 that is in the reflection area adjacent to the column reflection area RA6 via the wall portion 365B travel through the fifth passing portion 68B to the column reflection area RA6.

The fourth passing portions 68A and the fifth passing portions 68B include grooves similar to the grooves of the first passing portion 66 of the first embodiment. However, the fourth passing portions 68A and the fifth passing portions 68B may include grooves similar to those of the passing portion 166 of the second embodiment or may include through holes similar to those of the passing portion 266 of the third embodiment.

Brightness is likely to decrease in the row reflection areas RA5 and the column reflection areas RA6. However, with the configuration of this embodiment, a large amount of light rays among the light rays emitted by the LEDs 52 in surrounding areas can travel to the row reflection areas RA5 and the column reflection areas RA6 and brightness can be enhanced. As a result, brightness in the edge portions 360E, 360F, 360G, 360H of the reflection member 360 can be enhanced and eventually brightness in the edge portions of a backlight unit 300 can be enhanced. Uneven brightness can be suppressed not only in the corner portions but also in the edge portions.

The amount of light rays that can pass through the fourth passing portion 68A and the amount of light rays that can pass through the fifth passing portion 68B are preferably smaller than the amount of light rays that can pass through the first passing portion 66A. Therefore, the amount of light rays passing through the fourth passing portion 68A and the fifth passing portion 68B can be appropriately maintained to be small. Therefore, light rays can travel between the row reflection areas RA5 and the adjacent reflection areas through the fourth passing portions 68A and between the column reflection areas RA6 and the adjacent reflection areas through the fifth passing portions 68B such that the amount of light rays traveling through the fourth passing portions 68A and the fifth passing portions 68B can be appropriately adjusted not to be excessively large.

Other Embodiments

The technology described herein is not limited to the embodiments described above and illustrated by the drawings. For example, the following embodiments will be included in the technical scope of the present technology.

(1) The reflection members 60, 160, 260, 360 may not be necessarily configured as one unitary component but may include multiple separate components.

(2) The configurations of the first to fourth embodiments may be combined. The shapes of the first passing portions 66A, 166A, 266A, the second passing portions 66B, 166B, 266B, the third passing portions 66C, 166C, 266C, the fourth passing portions 68A, and the fifth passing portions 68B may not be necessarily same as those in the respective embodiments. For example, a reflection member may include the first passing portion 66A of the first embodiment, which is a groove, and include the second passing portion 266B and the third passing portion 266C of the third embodiment, which are through holes.

The invention claimed is:

1. A lighting device comprising:
light sources;
aboard having a mount surface on which the light sources are arranged; and
a reflection member disposed on the mount surface of the board and having a rectangular plan view shape, the reflection member including:
insertion holes in each of which at least one of the light sources is disposed, and wall portions defining a surface area of the reflection member into reflection areas in a grid, some of the wall portions surrounding at least one of the insertion holes, wherein
the reflection areas include a first reflection area at a corner portion of the reflection member, and
the wall portions include one wall portion that is included in the first reflection area and the one wall portion includes a passing portion through which light from one of the light sources that is adjacent to the first reflection area via the one wall portion passes.

2. The lighting device according to claim 1, wherein
the light sources are arranged in a row direction and a column direction,
the light sources include a first light source that is disposed in the first reflection area,
the one of the light sources is a second light source that is adjacent to the first light source in a diagonal direction via the one wall portion, and
the passing portion includes a first passing portion through which light from the second light source passes.

3. The lighting device according to claim 2, wherein
the passing portion further includes a second passing portion through which light from a third light source that is adjacent to the first light source with respect to the row direction via a first wall portion of the wall portions, and
the second passing portion is included in the first wall portion.

4. The lighting device according to claim 3, wherein
the passing portion further includes a third passing portion through which light from a fourth light source that is adjacent to the first light source with respect to the column direction via a second wall portion of the wall portions, and
the third passing portion is included in the second wall portion.

5. The lighting device according to claim 4, wherein an amount of light that passes through the second passing portion and an amount of light that passes through the third passing portion are smaller than an amount of light that passes through the first passing portion.

6. The lighting device according to claim 2, wherein
the reflection member includes a first edge portion extending along the row direction and a second edge portion extending along the column direction,
the reflection areas include a row reflection area that is in the first edge portion of the reflection member and a column reflection area that is in the second edge portion of the reflection member,
the wall portions include a row wall portion included in the row reflection area and a column wall portion included in the column reflection area, the row wall portion includes a row passing portion through which light from another one of the light sources that is adjacent to the row reflection area with respect to the column direction via the row wall portion passes, and the column wall portion includes a column passing portion through which light from other one of the light sources that is adjacent to the column reflection area with respect to the row direction via the column wall portion passes.

7. The lighting device according to claim 6, wherein an amount of light that passes through the row passing portion and an amount of light that passes through the column passing portion are smaller than an amount of light that passes through the first passing portion.

8. The lighting device according to claim 2, wherein the first light source has light emission intensity that is higher than light emission intensity of the light sources other than the first light source.

9. The lighting device according to claim 8, wherein the reflection areas include a second reflection area that is adjacent to the first reflection area with respect to the diagonal direction and in which the second light source is disposed, and the second light source has light emission intensity that is higher than light emission intensity of the light sources other than the first light source and the second light source.

10. The lighting device according to claim 9, wherein the reflection areas include a third reflection area that is adjacent to the first reflection area with respect to the row direction, the light sources include a third light source disposed in the third reflection area, the reflection areas include a fourth reflection area that is adjacent to the first reflection area in the column direction, the light sources include a fourth light source disposed in the fourth reflection area, light emission intensity of the third light source and the fourth light source is higher than light emission intensity of the light sources other than the first light source, the second light source, the third light source, and the fourth light source.

11. The lighting device according to claim 8, wherein the mount surface of the board is defined into dimming areas in each of which at least one of the light sources is disposed, the light sources are configured such that the light emission intensity can be adjusted for each of the dimming areas, and the light emission intensity is adjusted by controlling a current supplied to each of the light sources.

12. The lighting device according to claim 8, wherein the mount surface of the board is defined into dimming areas in each of which at least one of the light sources is disposed, the light sources are configured such that the light emission intensity can be adjusted for each of the dimming areas and configured to be driven with pulse width modulation, and the light emission intensity is adjusted by controlling a duty ratio of pulse width modulation signals that are for driving the light sources with pulse width modulation.

13. The lighting device according to claim 8, wherein the mount surface of the board is defined into dimming areas in each of which at least one of the light sources is disposed, the light sources are configured such that the light emission intensity can be adjusted for each of the dimming areas, and the light emission intensity is adjusted by using the light sources of different types.

14. The lighting device according to claim 1, wherein the wall portions have back surfaces that are opposite the board and front surfaces that are opposite surfaces from the back surfaces and the passing portion is a groove formed in a front surface of the one wall portion.

15. The lighting device according to claim 1, wherein the wall portions have back surfaces that are opposite the board and the passing portion is a groove formed in a back surface of the one wall portion.

16. The lighting device according to claim 1, wherein the passing portion is a through hole formed in the one wall portion.

* * * * *